United States Patent

Scotti et al.

[11] Patent Number: 6,131,686
[45] Date of Patent: Oct. 17, 2000

[54] ELECTRONIC FOUR-WHEEL DRIVE TRANSMISSION

[75] Inventors: Alessandro Scotti; Marcello Mongiardo, both of Modena; Ivano Resca, Bologna, all of Italy

[73] Assignee: New Holland North America, Inc, New Holland, Pa.

[21] Appl. No.: 08/880,697

[22] Filed: Jun. 23, 1997

[30] Foreign Application Priority Data

Jul. 12, 1996 [IT] Italy ................................ TO96A0599

[51] Int. Cl.[7] .................................................. B60K 17/354
[52] U.S. Cl. ...................... 180/245; 192/69.82; 192/91 A
[58] Field of Search .............................. 192/69.82, 108, 192/91 A; 180/245, 248, 197, 247

[56] References Cited

U.S. PATENT DOCUMENTS

| | | | |
|---|---|---|---|
| 4,848,508 | 7/1989 | Smirle et al. | 180/248 |
| 5,199,325 | 4/1993 | Reuter et al. | 74/861 |
| 5,330,030 | 7/1994 | Eastman et al. | 180/233 |
| 5,492,194 | 2/1996 | McGinn et al. | 180/233 |
| 5,799,749 | 9/1998 | Yamamoto et al. | 180/247 |
| 5,853,342 | 12/1998 | Pritchard et al. | 475/206 |

*Primary Examiner*—Kevin Hurley
*Assistant Examiner*—Andrew J. Fischer
*Attorney, Agent, or Firm*—Larry W. Miller; J. William Stader; Frank A. Seemar

[57] ABSTRACT

A transmission is described for a motor vehicle having selectable four-wheel drive. The transmission includes a coupling for selectively applying torque to the front wheels of the vehicle to switch between two-wheel drive and four-wheels drive in dependence upon slipping of the driven wheels. The coupling includes a drive member rotatable with the rear wheels, a driven member rotatable with the front wheels, the drive and driven members being movable axially relative to one another. The drive and driven member have teeth which mesh with one another in a first relative axial position of the drive and driven members to transmit torque from the drive to the driven member, but which are disengaged from one another in a second relative axial position of the drive and driven members to disconnect the drive to the front wheels. Slipping of the rear wheels is sensed electronically and is used to move the drive and driven members axially between the first and second relative positions in dependence upon the determined presence or absence of slipping of the driven wheels.

6 Claims, 7 Drawing Sheets

ELECTRONIC FOUR-WHEEL DRIVE TRANSMISSION

BACKGROUND OF THE INVENTION

The present invention relates to a transmission for an off-road vehicle, such as an agricultural tractor, having automatic selection of two-wheel drive or four-wheel drive modes of operation.

In an agricultural tractor provided with a conventional clutch to engage four-wheel drive, when the clutch is engaged, the front wheels are normally driven by about 2% faster than the rear wheels. This speed differential is caused by the geometry of the transmission members fitted to the front wheels. In off-road conditions, that is when the tractor is travelling over agricultural ground, because of the low speed at which the tractor normally runs and because of the fact that the agricultural ground offers a low adhesion to the tires, it is established that with the four-wheel drive transmission engaged all the wheels may slip even by up to 10–15% with respect to the speed imposed by the engine of the tractor so that the difference in speed between the front wheels and the rear wheels is not noticed.

On metalled road surfaces, however, because the tractor tends to be driven at higher speeds and because there is better adhesion between the tires and the road surface, there is a considerable slipping of the front wheels on the ground when four-wheel drive is engaged. The front wheels slip in preference to the rear wheels because in tractors most of the weight is supported by the rear wheels and the frictional force on the ground at the rear wheels is greater than at the front wheels.

Because the slipping of the front wheels on metalled road surfaces causes a high degree of wear on the front tires, it is preferred to disengage the clutch and revert to two-wheel drive when driving on good road surfaces.

Furthermore, on bends, especially on those of a short radius, two-wheel drive is to be preferred to four-wheel drive because even when the front axle differential is not locked, the front wheel on the outside of the bend tends to travel up to 20% faster than the rear wheels so that, if four-wheel drive would be engaged, this front wheel would slip, again causing considerable wear on the tire.

For these reasons, it is desirable in a tractor to be able to select between two-wheel and four-wheel drive in dependence upon the road surface on which the tractor is driven. Ideally, the tractor should have four-wheel drive engaged only under poor road adhesion conditions when the rear wheels slip with respect to the ground.

In the prior art, it is known to provide a transmission in which two-wheel and four-wheel drive can be selected by the operator of the tractor, but this requires the operator to have the skill to know when to change between four-wheel and two-wheel drive for the best traction and minimum tire wear.

To simplify the task of the operator, it has already been proposed to provide a transmission with a control system that can automatically select four-wheel drive, whenever required to reduce slipping of the rear wheels.

EP-A-0.432.549 which is believed to represent the closest prior art to the present invention, discloses a control system for automatically engaging four-wheel drive in a vehicle transmission. The transmission comprises a first drive shaft for transmitting drive from the engine to two rear wheels and a second drive shaft for transmitting drive to two front wheels. A clutch acts, when engaged, to couple the two drive shafts for rotation with one another and the drive transmission geometry is such that, with the clutch engaged, the transmission causes the front wheels to be driven slightly slower than the rear wheels.

In the second drive shaft, a special coupling is provided which comprises toothed drive and driven members that mesh with one another with lost motion, that is to say, the two members can rotate one relative to the other through a limited angle. Relative rotation of the drive and driven members of the coupling is sensed by an element adapted to move axially between two end positions as the lost motion in the coupling is taken up to indicate the direction in which torque is being transmitted through the coupling. A sensor detects the end positions of the latter element and generates an electrical signal that is used by an electronic processing unit to control engagement or disengagement of the clutch.

The principle on which the above proposal is based is that, when the rear wheels slip in two-wheel drive, the drive member of the lost motion coupling will try to rotate faster than the driven member, the speed of the latter corresponding to the road speed of the vehicle. When on the other hand four-wheel drive is engaged and the wheels are not slipping on the ground, then the front wheels will try to roll on the ground faster than the speed at which they are being driven by the transmission with the result that the driven member will try to rotate faster than the drive member and will apply a reverse torque to the engine through the lost motion coupling. During the reversal of the direction of the torque through the coupling, the backlash or lost motion in the coupling is taken up resulting in an angular relative displacement between the drive and the driven members which is translated into an axial displacement of the sensor element. As already mentioned, in response to the movement of the sensor element in the one or other direction, the electronic processing unit controls the four-wheel drive clutch to either engage or to disengage.

Although the above arrangement has proven to be extremely efficient in practice, it nevertheless suffers from the disadvantage that, in the latter proposal, the clutch is a slipping clutch which, even when disengaged, is required to apply some torque to let the speed of the first drive shaft influence the rotational speed of the drive member of the lost motion coupling while the drive member rotates with the second drive shaft. It furthermore is observed that in EP-A-0.432.549 a signal should be provided to the electronic processing unit to indicate whether the tractor is driving forwardly or in reverse whereby the logic behind the lost motion coupling can be reversed. Such a signal is obtained from a switch operatively connected to the reverse lever of the tractor.

SUMMARY OF THE INVENTION

It is therefore an object of the present invention to provide an automatic four-wheel drive engagement device which obviates the necessity of indicating the drive direction of the tractor and incorporates the function of the four-wheel drive clutch into the lost motion coupling.

According to a first aspect of the present invention, there is provided a transmission for a motor vehicle having selectable four-wheel drive comprising a coupling for selectively applying torque to the front wheels of the vehicle to switch between two-wheel drive and four-wheel drive; said coupling comprising a drive member rotatable with the rear wheels and a driven member rotatable with the front wheels, the drive and driven members being movable axially relative to one another.

According to the principles of the first aspect of this invention, the transmission includes teeth on the drive and driven members which mesh with one another in a first relative axial position of the drive and driven members to transmit torque with a limited degree of lost motion from the drive member to the driven member and which are disengaged from one another in a second relative axial position of the drive and driven members to disconnect the drive to the front wheels, means for determining slip between the rear wheels and the road surface, and means for axially moving the drive and driven members between the first and second relative positions in dependence upon the determined presence or absence of slipping of the rear wheels.

In this aspect of the invention, the drive and driven members of the coupling are engaged with one another when drive is to be transmitted through the coupling and are totally disengaged from one another by being moved axially when two-wheel drive is engaged. Apart from dispensing with the need for a costly separate clutch, the invention offers the advantage that it does not rely on surfaces that slip relative to one another when two-wheel drive is engaged, so that no component is subjected to unnecessary wear.

The means for determining slip between the rear wheels and the road surface may conveniently be means for determining the direction of torque transmission through the coupling. If the front wheels are geared to rotate more slowly than the rear wheels in the absence of slip at that road surface, then when the vehicle is travelling on a metalled road surface the front wheels will overrun and will apply a torque to the engine in a direction to make it race. On the other hand, if the rear wheels are slipping then the engine will apply a torque to the front wheels to drive them. The direction of torque transmission through the coupling therefore reverses as the vehicle moves from off-road conditions to a metalled road surface.

The direction of torque transmission may be sensed in a variety of ways, for example by measuring the deflection along the length of a torsion tube included in the torque transmission path. It is preferred however for the teeth on the drive and driven member of the coupling to engage one another with lost motion and to determine the direction of torque transmission through the coupling by monitoring the relative angular displacement of the drive and driven members.

In accordance with a second aspect of the present invention, there is provided a control system for a transmission of a motor vehicle having selectable four-wheel drive for switching between two-wheel drive and four-wheel drive in dependence upon slipping of the driven wheels. The control system includes a first sensor for producing a first electrical signal varying cyclically in synchronism with the rotation of the rear wheels, a second sensor for producing a second electrical signal varying cyclically in synchronism with the rotation of the front wheels, means for comparing the frequencies of the first and second electrical signals to produce an output signal for causing engagement of a coupling supplying driving torque to the front wheels in response to the frequency difference exceeding a threshold value, and means for determining the direction of torque transmission through the coupling and disengaging the coupling when the front wheels are sensed to apply a torque through the coupling in a direction to increase the engine speed.

Preferably, the coupling is a lost motion or a resilient coupling the ends of which may rotate relative to one another in dependence upon the direction of torque transmission through the coupling and the means for determining the direction of torque transmission through the coupling comprises means for comparing the phase of the first and second electrical signals.

In accordance with a third aspect of the present invention, a transmission for a motor vehicle is provided having selectable four-wheel drive comprising a coupling for selectively applying torque to the front wheels of the vehicle to switch between two-wheel drive and four-wheel drive; said coupling comprising a drive member rotatable with the rear wheels and a driven member rotatable with the front wheels, the drive and driven members being movable axially relative to one another.

According to this third aspect of the invention, the transmission includes teeth on the drive and driven members which mesh with one another in a first relative axial position of the drive and driven members to transmit torque with a limited degree of lost motion from the drive member to the driven member and which are disengaged from one another in a second relative axial position of the drive and driven members to disconnect the drive to the front wheels, means for determining the percentage slip of the rear wheels relative to the front wheels, and means for axially moving the drive and driven members between the first and second relative positions in dependence upon the value of the determined percentage slip.

In accordance with a fourth aspect of the present invention, a method is provided of controlling a transmission of a motor vehicle having selectable four-wheel drive for switching between two-wheel drive and four-wheel drive in dependence upon slipping of the driven wheels, the transmission including a coupling to transmit torque from the rear wheels to the front wheels of the vehicle and sensor means operatively connected to said coupling.

This method of controlling the transmission includes the steps of producing a first electrical signal varying cyclically in synchronism with the rotation of the rear wheels, producing a second electrical signal varying cyclically in synchronism with the rotation of the front wheels, comparing the frequencies of the first and second electrical signals, and producing an output signal for causing engagement of the coupling to supply driving torque to the front wheels in response to the frequency difference exceeding a first threshold value.

BRIEF DESCRIPTION OF THE DRAWINGS

The advantages of this invention will be apparent upon consideration of the following detailed disclosure of the invention, especially when taken in conjunction with the accompanying drawings wherein.

DETAILED DESCRIPTION OF THE PREFERRED EMBODIMENT

Figure 1:
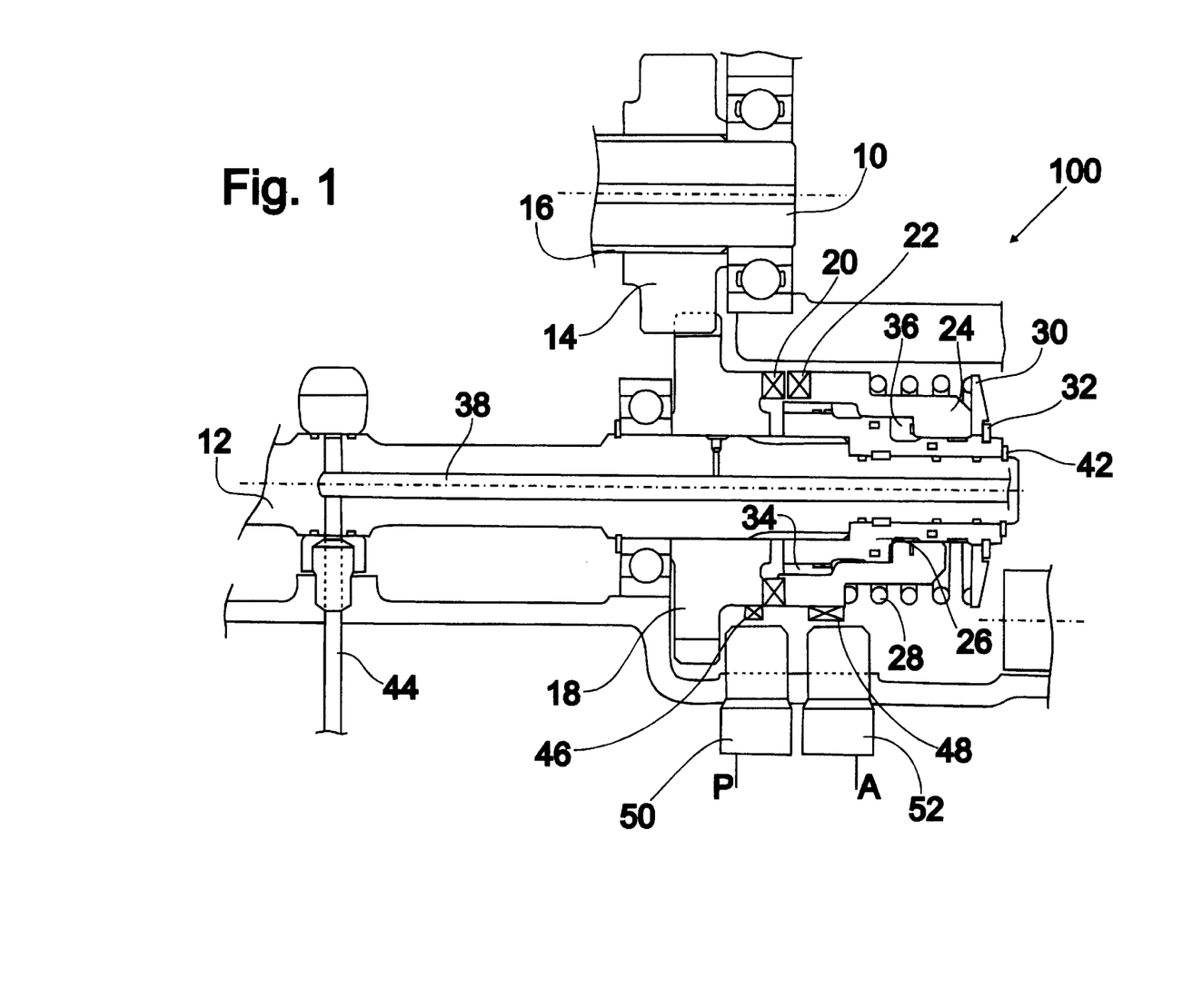
FIG. 1 is a partial section through a transmission of a tractor showing the coupling for selectively applying drive to the front wheels in dependence upon slipping of the rear wheels.

FIG. 1 shows part of a transmission for a tractor. The transmission is neither shown complete nor in detail as its construction is in itself well known and an understanding of its operation is not fundamental to the present invention. It suffices to understand that the transmission has an output shaft 10 that leads to the rear wheels and is driven with variable drive ratio by the engine of the tractor. The transmission also has a second output shaft 12 which drives the front wheels, the two shafts 10 and 12 being selectively coupled to one another by a coupling which is generally designated 100 and which will now be described in greater detail.

A gear 14 is mounted by means of a keyway 16 for permanent rotation with the shaft 10 and meshes with a gear 18 that is freely rotatable about the shaft 12. The gear 18 has two axially projecting dog teeth 20 which are selectively engageable with two axially projecting teeth 22 on a collar 24 fast in rotation with the shaft 12. The collar 24 is slidably mounted on a sleeve 26 and is keyed for rotation with the latter by splines 34. Similarly, the sleeve 26 is keyed to the shaft 12 by splines 40. The sleeve 26 is captured between a shoulder on the shaft 12 and a circlip 42 so that it cannot move axially relative to the shaft 12.

The collar 24 is slidable axially over the sleeve 26 and between these two elements there is defined a sealed annular working chamber 36 which communicates through radial apertures (not shown) in the sleeve 26, radial bores (not shown) in the shaft 12 and an axial blind bore 38 in the shaft 12 with a supply conduit 44 which is selectively connected to a pressure supply or to a drain in order to disengage or engage the teeth 20, 22 of the coupling 100, respectively.

In the sectional view of FIG. 1, the upper half of the collar 24 is shown in the position where pressure is applied through the conduit 44 to the working chamber 36. The pressure moves the collar 24 to the right as viewed in FIG. 1 against the action of a spring 28 that rests against a spring abutment plate 30 held on the sleeve 26 by a circlip 32. When the collar 24 is moved to the right, the teeth 20 and 22 do not mesh with one another and the drive between the gear 18 and the collar 24 is disengaged. When the conduit 44 is connected to drain, on the other hand, the spring 28 urges the collar 24 to the left as viewed in FIG. 1 in the direction to collapse the working chamber 36 and cause the teeth 20 and 22 to mesh with one another, as shown in the lower part of FIG. 1. In this position drive is transmitted from the shaft 10, via the gear 14, the gear 18, the meshing teeth 20 and 22, the collar 24 and the sleeve 26 to the shaft 12 so that the engine drives both the front and the rear wheels of the tractor.

The teeth 20 and 22 mesh with one another with intentionally provided free play or backlash, to act as a lost motion coupling. The meshing teeth 20 and 22 are shown schematically in FIGS. 3*a* to 4*b*. Each of the teeth 20 and 22 subtends an angle of 55° at the center of rotation so that while in mesh with one another they may rotate relative to one another by up to 70°, this free play constituting the lost motion in the coupling.

Figures 3A, 3B, 3C:
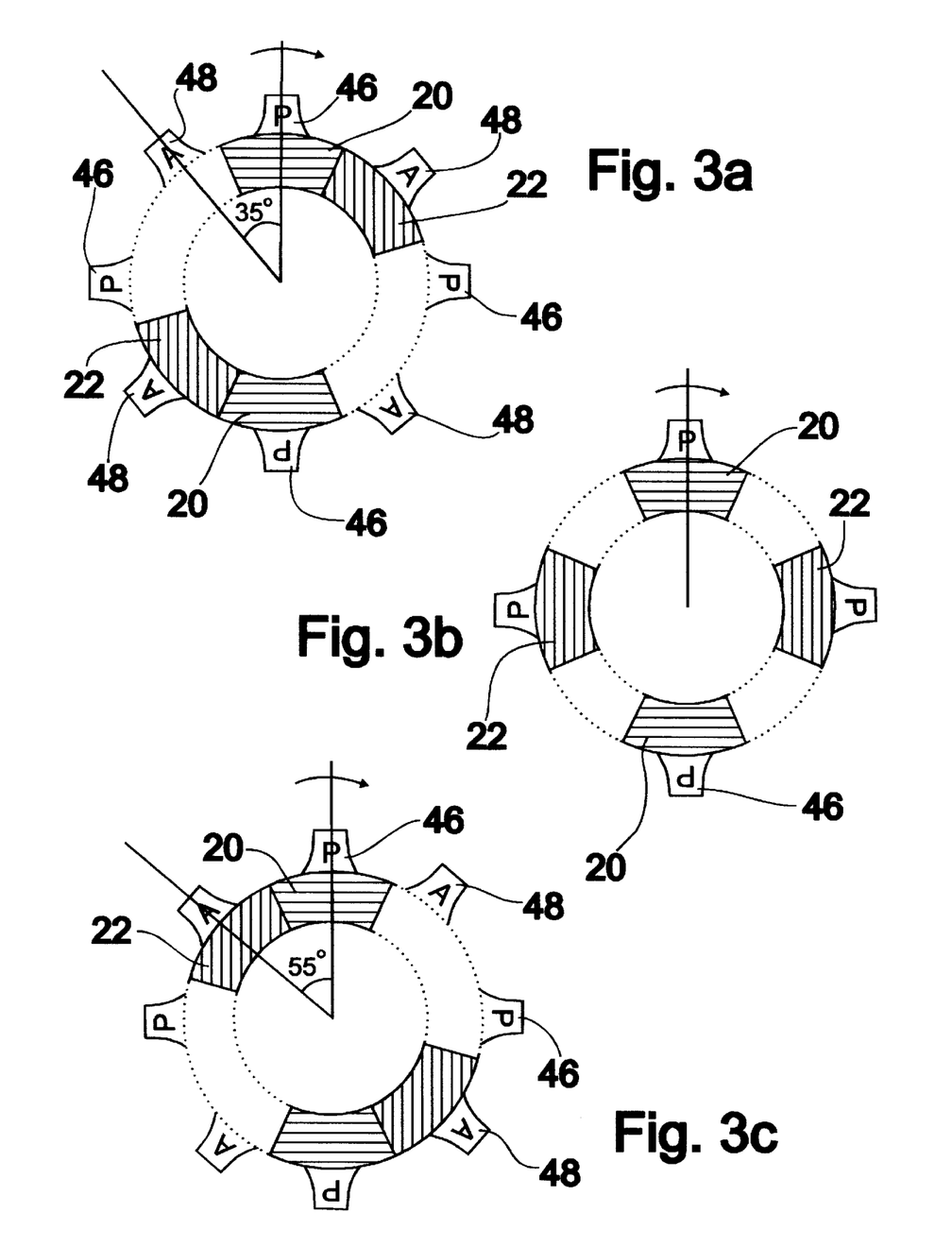
FIGS. 3a to 3c show schematically a section through the coupling in FIG. 1 under different driving conditions while the tractor is moving forwards.

The direction in which this lost motion is taken up depends on the direction through which torque is transmitted through the coupling. In FIGS. 3*a* to 3*c*, the coupling is represented as rotating in the clockwise direction, as indicated by the arrow, which corresponds to the forward drive of the tractor. If the gear 18 tries to turn faster than the collar 24 then the teeth 20 of the gear 18 will drive the teeth 22 of the collar 24 and the lost motion is taken up in one direction, as represented in FIG. 3*a*. On the other hand, if the collar 24 tries to turn more rapidly than the gear 18 then the teeth 22 will drive the teeth 20 and the lost motion is taken up in the opposite direction, as represented in FIG. 3*c*. The relative angular position or phase of the gear 18 and the collar 24 will therefore depend on the direction of torque transmission through the coupling 100.

The gear ratios in the front and rear axles are selected such that when torque is transmitted to drive the front wheels, the speed of the front wheels (as measured at their circumferential surface in contact with the ground) is slightly less than the speed of the rear wheels. When driven off-road, both the front and the rear wheels will slip on the ground and the small difference in their speeds means only that the front wheels will slip a little less than the rear wheels. On the other hand, when the tractor is driven on a metalled road surface and all the wheels have a good grip, then the front wheels will be driven by friction with the ground faster than they are driven by the engine and they will transmit a torque in the reverse direction through the coupling 100 in the direction to increase the speed of the engine. The relative angular position of the gear 18 and the collar 24 is therefore indicative of the condition of the road surface and can be used to control automatically when the coupling 100 should be engaged or disengaged.

Figure 5A:
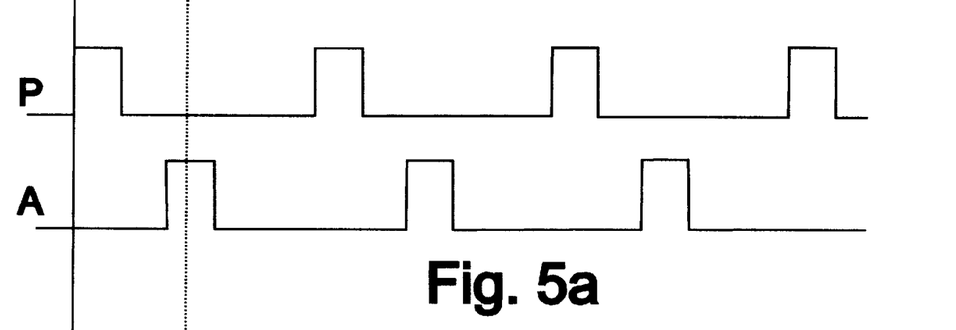
FIGS. 5a to 5c show the signals produced by the sensors associated with the coupling of FIG. 1, when the teeth P and A of the coupling are in the positions shown in FIGS. 3*a* to 3*c*, respectively.
Figure 5B:
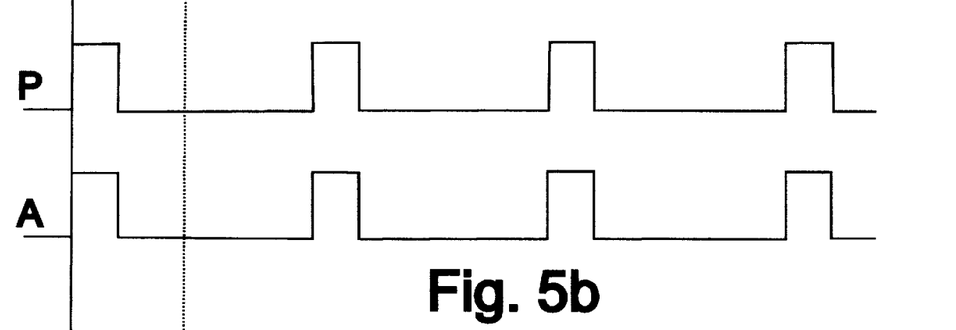
Figure 5C:
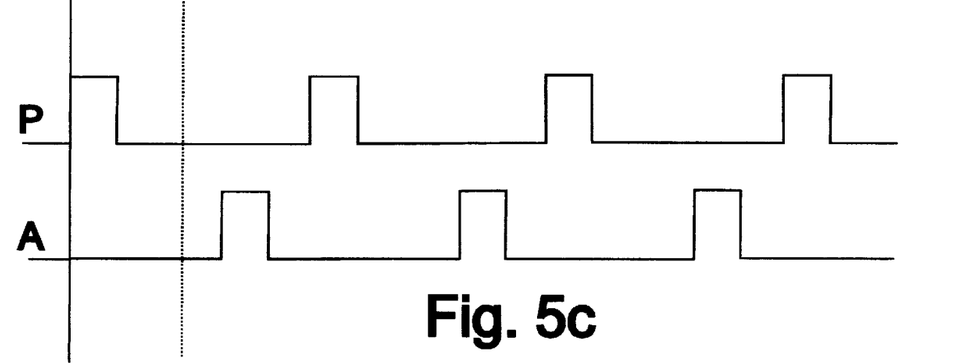

In order to measure the angular position of the gear 18 relative to the collar 24, the gear 18 is provided with radially extending teeth 46 and the collar with radially extending teeth 48, which are electro-magnetically sensed by inductive sensors 50 and 52, respectively. The sensors 50 and 52 may for example comprise coils with a small air gap. As the teeth 46 or 48 pass near the air gap, the inductance of the coil will change suddenly causing a rapid change in the electrical output of the sensor. The two sensors 50 and 52 will therefore produce signals that can be suitably processed to generate pulsed signals P and A which will be described in more detail below by reference to FIG. 5. The P signal corresponds to the teeth 46 and hence to rotation of the rear wheels whereas the A signal corresponds to the teeth 48 and hence to rotation of the front wheels.

As exemplified in FIGS. 3*a* to 4*b*, the gear 18 and the collar 24 respectively comprise four teeth 46 and four teeth 48. As well the teeth 46 as the teeth 48 are equi-angularly spaced and the arrangement of the teeth is such that two teeth 46 are centered relative to the dog teeth 20 whereas two teeth 48 are centered relative to the dog teeth 22. A different number of teeth 46, 48 and dog teeth 20, 22 could be provided but it has been found that the arrangement as shown in FIGS. 3*a* to 4*b* offers a good compromise between the number of detections during each revolution of the coupling and the accuracy of measurement.

In case a different number of teeth 46, 48 and 20, 22 nevertheless would be chosen, it is preferred, for ease of processing of the signals P and A obtained from the teeth 46, 48, to have twice as many teeth 46 and 48 as respectively dog teeth 20 and 22. As will become apparent below by reference to FIG. 5, it is imperative, in order to be able unambiguously to determine the direction of torque transmission, to design the coupling 100 in such a manner that the angle between the centers of two adjacent teeth 46 is larger than the lost motion angle. The same applies to the teeth 48. This is ensured by the choice of an appropriate angle subtended by respectively the teeth 20 and 22 at the center of rotation.

Figure 2:
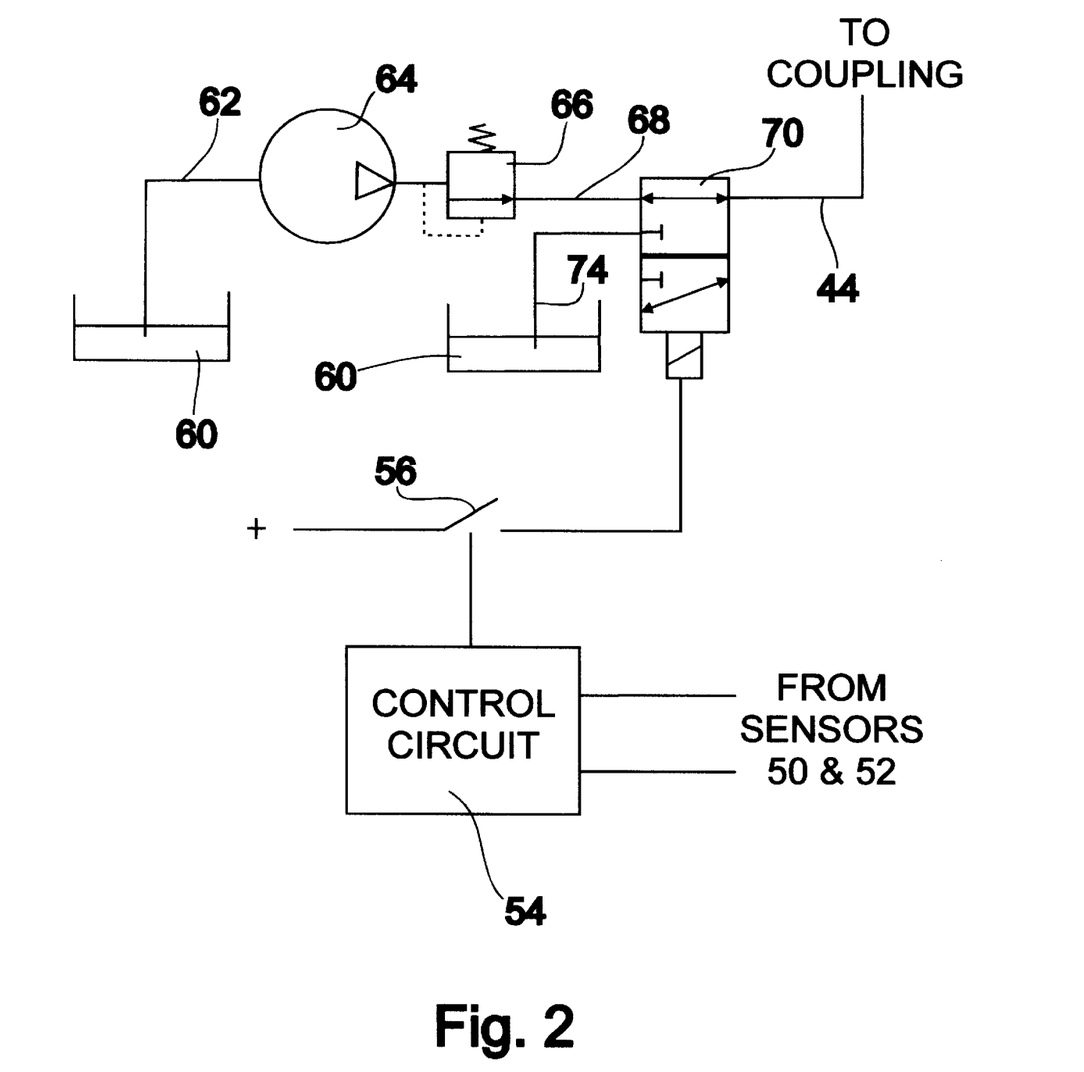
FIG. 2 shows an electro-hydraulic circuit for controlling the coupling of FIG. 1.

Referring first to FIG. 2, it will be seen that the signals from the sensors 50 and 52 are applied to a control circuit 54 that determines from these signals the road conditions on the basis of the criteria described above. The output of the control circuit 54 acts on a relay having a contact 56 that controls a three port, two position electro-hydraulic valve 70. In the illustrated position, the relay contact 56 is open and the valve 70 connects the conduit 44 leading to the working chamber 36 of the coupling 100 to the output line 68 of a pressure regulator 66. Fluid under pressure is supplied to the regulator 66 by a pump 64 which is connected to a reservoir 60 through an input line 62. In this position, the pressurized chamber 36 causes the drive to the front wheels to be disengaged in the manner earlier described.

When the drive to the front wheels is to be engaged, the control circuit 54 closes the relay contact 56. The valve 70 is now energized into its second position in which the line 68 from the regulator 66 is blanked off and the conduit 44 is connected through a return line 74 to the reservoir 60. The spring 28 now compresses the working chamber 36 and moves the collar 24 to the left (when considering FIG. 1) thereby causing the dog teeth 20 and 22 to mesh with one another.

Figure 4A:
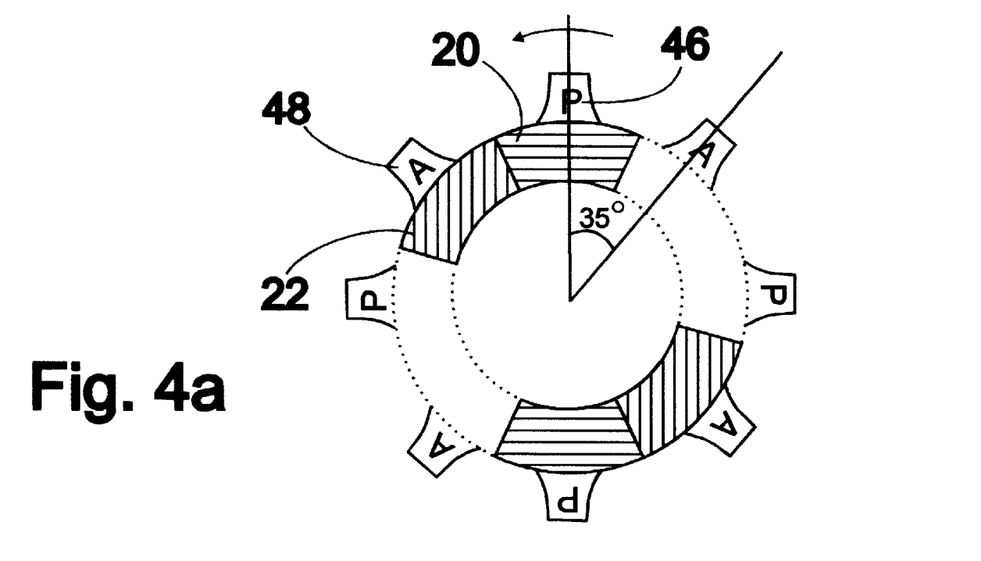
FIGS. 4a and 4b are schematic sections similar to those shown in FIGS. 3a and 3c, respectively, showing the coupling under different driving conditions while the tractor is moving in reverse.
Figure 4B:
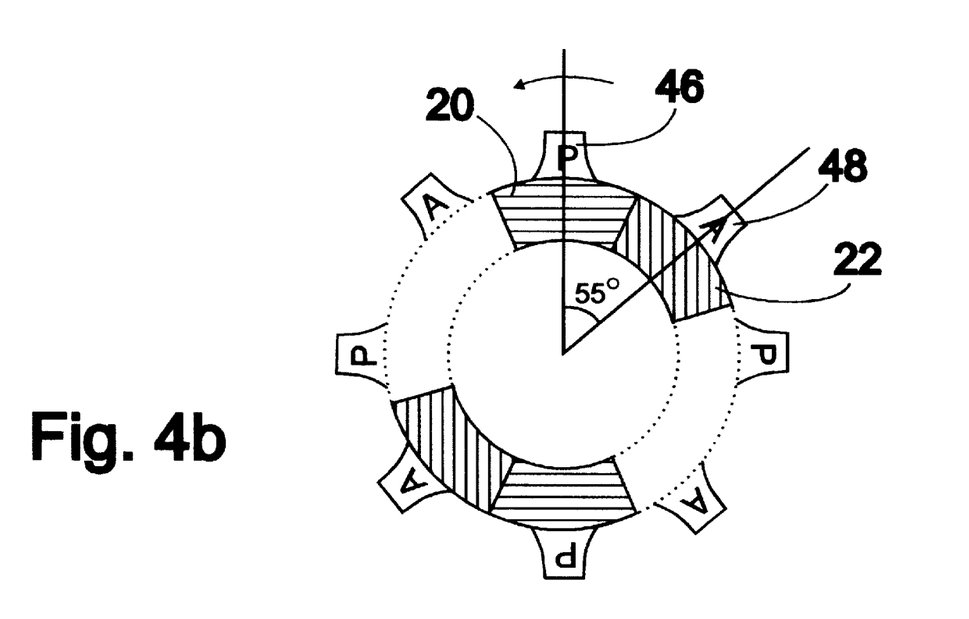

The operation of the control circuit 54 will now be described by reference to FIGS. 3 and 4 and the input signals shown diagrammatically in FIG. 5.

When the coupling 100 is disengaged, the shafts 10 and 12 can rotate at different speeds. When driving on a road surface with good tire adhesion, the front wheels, driven by the ground, will drive the shaft 12 at a higher rotational speed than the speed of the shaft 10 driving the rear wheels. Therefore the A signal will have a higher frequency than the P signal. Once the rear wheels start slipping, however, the A signal, which is related to the speed of the tractor along the ground, will have a lower frequency than the P signal.

The percentage slip, S, of the rear wheels can be expressed by the formula $$S = \frac{VAP - VAA}{VAP}$$

where VAP is the rotational speed of the shaft 10 connected to the rear wheels (corresponding to the frequency of the P signal) and VAA is the rotational speed of the shaft 12 connected to the front wheels (corresponding to the frequency of the A signal). On good road surfaces, when the four-wheel drive is disengaged and the shaft 12 is rotating faster than the shaft 10, VAA is larger than VAP and S therefore will have a negative value which in practice can range from −3% to −7%. Off-road on the other hand the slip S will have a positive value since VAP will be larger than VAA.

The control circuit 54 therefore acts while the coupling 100 is disengaged to compute the value S from the frequencies of the P and A signals. Once the computed value S is greater than e.g. 2%, meaning that slip of the rear wheels is experienced, the coupling 100 is engaged to switch to four-wheel drive and once engagement has occurred the frequencies of the P and A signals will be locked to one another. It will be appreciated that due to the free play inbetween the teeth 20 and 22, the value of S not necessarily instantly will drop from above 2% to 0% when engagement occurs.

It indeed is conceivable that, at the moment of engagement, the teeth 20 and 22 are positioned relative to each other in such a manner that part of the free play or eventually the complete free play first should be taken up in a given direction before actual locking of the teeth 20, 22 will take place. This of course means that inbetween the instant of engagement and the instant of actual locking the frequencies of the P and A signal will not be equal to each other but nevertheless will progress to the same value. Therefore, engagement is only assumed to have taken place once the computed value of S drops to below 0.2%. The margin of 0.2% is taken to take account of minimal vibrational movements which the teeth 20, 22 eventually might make relative to one other. Once engagement is confirmed, the frequencies of the A and P signals are no longer compared but the control circuit 54 starts to analyze the relative phase of the A and P signals to determine when four-wheel drive should again be disengaged.

The frequency comparison within the control circuit 54 may be performed in any convenient manner. Conveniently, the control circuit 54 can be formed as a digital controller, in which case each of the two signals A and P can act to control the counting of clock pulses, in which case the count reached at the end of each cycle will be indicative of repetition frequency. The counts may then be subtracted from one another and the relay contact 56 closed if the ratio of the speed difference of the front wheel speed to the rear wheel speed exceeds a preset threshold.

Once the coupling 100 has been engaged and locked, then the signals P and A will necessarily have the same frequency but their phase will be dependent upon the direction of torque transmission for the reasons described earlier. FIG. 5a shows the signals P and A when the tractor is being driven off-road and the rear wheels are slipping. Here the coupling will be in the position represented by FIG. 3a with the gear 18 leading the collar 24, i.e. the teeth 20 are driving the teeth 22, and the signal P will similarly lead the signal A in phase. When the tractor returns to a road surface with good tire adhesion, the coupling teeth will move towards the position shown in FIG. 3c generating the P and A signals shown in FIG. 5c. In moving from the position shown in FIG. 3a to that shown in FIG. 3c, the coupling will pass temporarily through a median position shown in FIG. 3b in which the teeth 46 overlap the teeth 48 (and therefore only the P teeth are shown). In this position, the shafts 10 and 12 are independently driven at the same speed by the engine and the front wheels, respectively. The P and A signals generated in the position of FIG. 3b are shown in FIG. 5b.

As can now be seen from FIG. 5, if the control circuit measures time commencing with the leading edge of each P pulse and terminating with the leading edge of the next A pulse then for as long as the rear wheels are slipping the measured time will be less than a fixed threshold value represented by the dotted line in FIG. 5. This measured time period corresponds to the phase angle drawn in FIG. 3 which has a value of between 35° and 0° while the teeth 20 may be considered to drive the teeth 22 and between 90° and 55° while the teeth 22 may be considered to drive the teeth 20. In as much as the control circuit always compares a P signal with a subsequent A signal, as already mentioned above, it will be understood that the transition from one condition to the other occurs when the P teeth overlap the A teeth, as shown in FIGS. 3b and 5b. Indeed, in this position, the measured phase angle between the P and A signals suddenly changes from 0° to 90°. If the threshold represented by the dotted line in FIG. 5 is set at 45° then this allows an adequate margin for measurement error and permits a reliable indication to be generated in the control circuit 54 when the direction of torque transmission through the coupling 100 is reversed.

Once again, the phase difference can readily be determined by use of digital techniques. If a counter commences counting with each leading edge of signal P and stops counting with each leading edge of signal A then the count reached at the end of each cycle will be indicative of the phase difference and will exceed a fixed threshold only when the wheel grip is restored.

An advantage of this form of electronic sensing of wheel slip is that it is not dependent upon the direction of travel and the control circuit functions equally well when the tractor is in reverse without the need for any modification. This can readily be appreciated from FIGS. 4a and 4b. The arrangement is rotating in the anti-clockwise direction and the position of the coupling 100 is shown in reverse with slip and in reverse without slip, respectively. In essence, though the lost motion is taken up in the opposite direction when the tractor is in reverse, the teeth 46 and 48 also move in the opposite direction past the sensors, and the net result is that FIG. 4a is a mirror image of FIG. 3a. For this reason, the relative phase of the A and P signals is unaltered and the same criteria can be used for engaging and disengaging four-wheel drive.

Furthermore, it is not necessary for special steps to be taken when the tractor is turning. During tight turns, the front wheels rotate faster than the rear wheels and, under this condition, it is preferred to disengage four-wheel drive so that the front wheels should not slip and cause damage to the tires or to the ground if the tractor is for example being driven over a lawn. In the present invention, four-wheel drive is automatically disengaged if the front wheels turn faster than the rear wheels so no special steps need to be taken to disengage four-wheel drive when the steering is on a tight lock.

When the tractor is on a hill sloping downwardly in the direction of travel and the engine is used to brake the rear wheels to prevent the tractor from running too fast down the steep incline, if the tractor is in two-wheel drive, then the rear wheels may start sliding over the ground. Consequently, their speed will be considerably less than that of the front wheels giving rise to negative slip with values exceeding 7% (i.e. S<−7%). If the value of S computed by the control circuit 54 should drop below e.g. −14% (which is a predetermined value), then this can be used as an indication that the tractor is slipping down a steep incline and four-wheel drive can be engaged by the control circuit 54.

It will be clear that in this case, however, relative phase of the P and A teeth cannot be used as the criterion for return to two-wheel drive since otherwise four-wheel drive would be disengaged immediately after it has been engaged resulting in instability of the system. Such instability can however be avoided by the use of an inclination or slope sensor. Four-wheel drive can in this case be engaged when there is a signal from the inclination sensor indicating that a predetermined inclination value (e.g. 10°) has been exceeded in combination with a signal that S<−14%. Four-wheel drive can subsequently be disengaged again only when the inclination value has dropped below a preferable other predetermined inclination value (e.g. 5°), as this will improve the stability of the system.

Because four-wheel drive will not be disengaged while the tractor remains on an incline of a certain degree, unless further measures are taken, it would be possible for four-wheel drive to remain engaged even if the steering is set to a tight lock. Because it is desirable to disengage four-wheel drive when a steering lock is applied, even if the tractor is on a steep incline it is preferred to provide a steering sensor to override the inclination sensor and permit four-wheel drive to be disengaged even when the tractor is on a steep slope, for as long as a steering lock is sensed. As soon as the steering lock is no longer sensed, then four-wheel drive will again be re-engaged until such time as the inclination sensor determines that the tractor is no longer on a steep incline.

Figure 6:
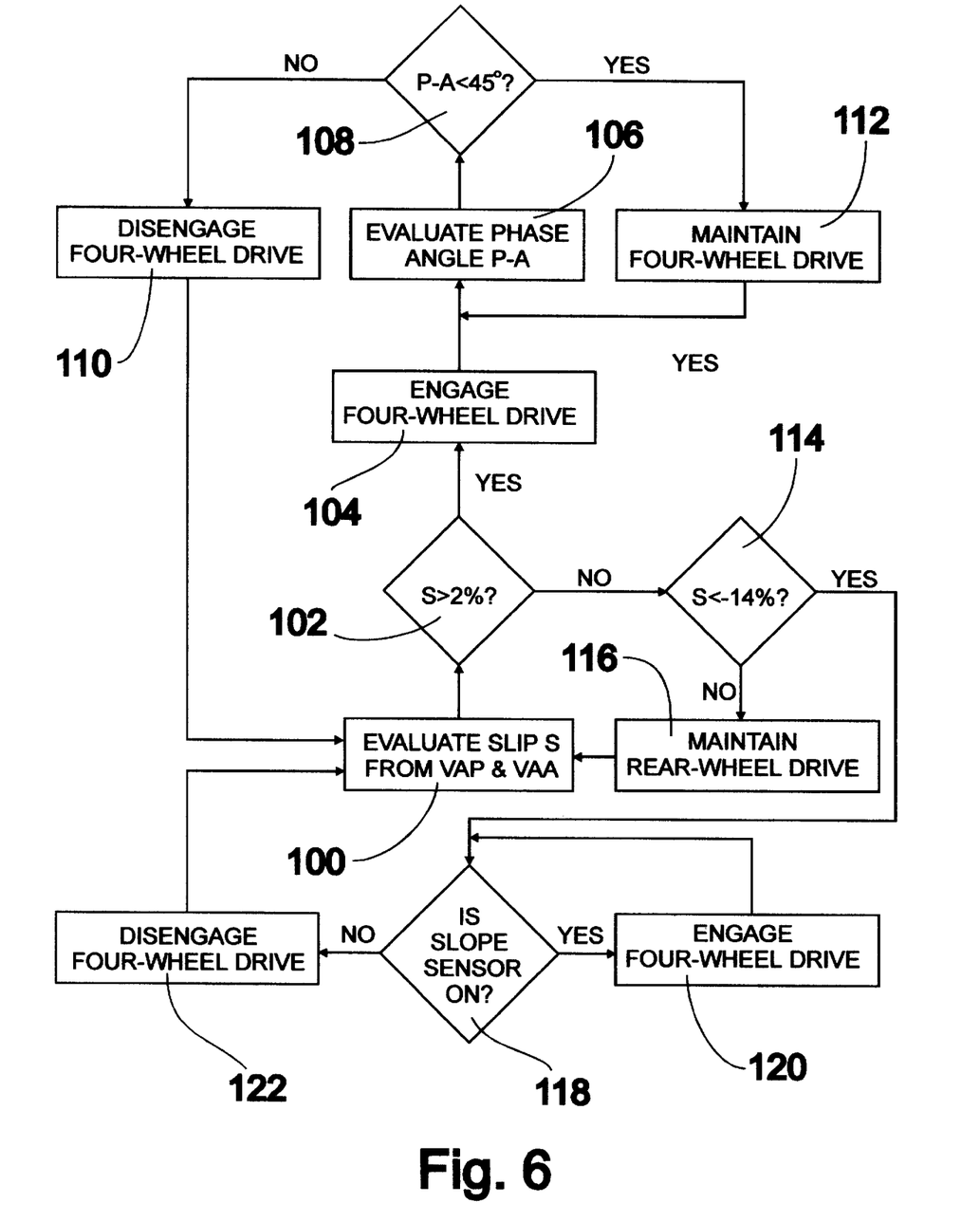
FIG. 6 is a flow chart illustrating the control logic employed in a four-wheel drive control system fitted with a slope detector.

The operation of a transmission as described above will be better understood by reference to the flow chart of FIG. 6. Starting at the block 100, it is assumed that the vehicle is being driven with rear-wheel drive engaged and the drive to the front wheels disengaged. The slip S is computed in the block 100 from the frequencies of the signals VAP and VAA, representing the rotational speeds of the gear 18 (corresponding to the speed of the rear wheels) and the collar 24 (corresponding to the speed of the front wheels), respectively.

In block 102, it is determined if the value S of the slip exceeds 2%. If it does, then the vehicle is being driven under a condition where slip of the rear wheels is experienced, so normally off-road, whereupon in block 104 four-wheel drive is engaged. The routine will remain in block 104 until it is determined that S has dropped below 0.2% meaning that a complete locking of the coupling 100 may be assumed. When all wheels are being driven, the phase angle P-A (see FIG. 3) is evaluated in the block 106 and in block 108 it is determined if the value of P-A is less than or greater than 45°. If P-A is less than 45°, the rear wheels are still slipping and in block 112 the engagement of four-wheel drive is maintained. On the other hand, if P-A is found to exceed 45°, then grip has been restored to the road wheels and in block 110 the drive to the front wheels is disengaged and the system returns to the starting condition in block 100.

The blocks so far described by reference to the flow chart of FIG. 6 are also present in the flow chart of FIG. 7 though they have been omitted from FIG. 7 to avoid unnecessary repetition.

If in block 102 S is found to be less than 2%, it is determined in block 114 if S is also less than −14%. So long as S lies between 2% and −14% no action is taken and the vehicle is maintained in block 116 in rear-wheel drive. If however S is found in block 114 to be less than −14% then it is likely that the rear wheels are attempting to brake the vehicle while it is sliding down a steep slope. Within the block 118 it is then determined if a slope sensor has been actuated to indicate that the vehicle is on a slope of a predetermined angle. If the answer is positive, then for as long as the vehicle is sensed to be on said slope, four-wheel drive is engaged in block 120 so that the front wheels may assist in braking the vehicle. As soon as the vehicle is sensed no longer to be on a steep incline, four-wheel drive is disengaged in block 122 and the system is returned to its starting condition.

In FIG. 6, the only way to return to rear-wheel drive after a slip S less than −14% has been detected is if the slope sensor ceases to be on. Therefore four-wheel drive is retained even if a full steering lock is engaged and this is undesirable. This problem is avoided by providing a steering lock sensor and modifying the control logic in the manner now to be described by reference to FIG. 7. In this figure, blocks that serve the same function as blocks in FIG. 6 have been allocated the same reference numerals to avoid repetition of description.

Figure 7:
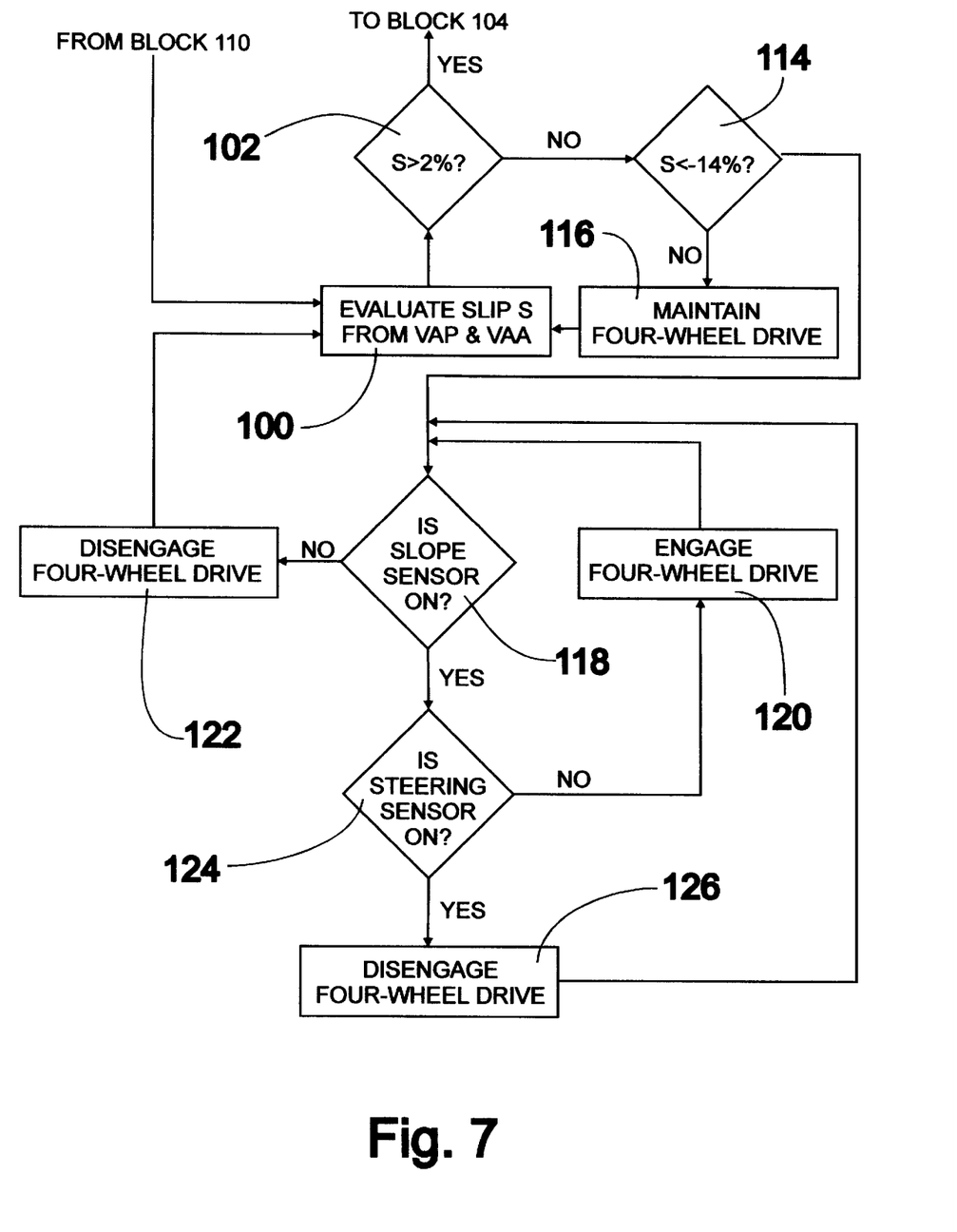
FIG. 7 shows a modification of the flow chart shown in FIG. 6 illustrating the control logic in a control system additionally fitted with a steering lock sensor.

In FIG. 7, if in block 118 the slope sensor is on, four-wheel drive is not immediately engaged but it is first determined in block 124 if the steering sensor is also on. If a steering lock is off, then four-wheel drive is engaged in block 120 but if at any time a steering lock is sensed, four-wheel drive is disengaged in block 126. The flow logic in this case, however, does not now return to the block 100, as is the case when the slope sensor determines that the vehicle is no longer on a steep incline, but returns to the block 118. The effect of this is that, once the vehicle is sensed to be on a slope, four-wheel drive is disengaged and engaged with the application and removal of a steering lock without reference to the value of the wheel slip S. The system does not revert to selection of drive mode in dependence upon sensed wheel slip until the slope sensor determines that the vehicle is no longer on a steep incline.

It should be appreciated that the above description is given only by way of example and that various modifications may be made within the scope of the invention as set forth in the appended claim. In particular, it is not essential that the lost motion required to determine the direction of torque transmission be achieved by free play between the teeth of the coupling. For example, if a resilient torque transmission element, such as a torsion tube or a spring, is used at any convenient location in the transmission path to the front wheels then the relative rotation of the ends of the element will provide an indication of the direction of torque transmission to or from the front wheels.

Furthermore, though it is preferred to use digital techniques to measure the relative frequency and the relative phase of the signals from the sensors associated with the front and rear wheels, this is not essential and the control circuit 54 may instead employ analogue techniques.

It will be understood that changes in the details, materials, steps and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the invention. Accordingly, the following claims are intended to protect the invention broadly as well as in the specific form shown.

Having thus described the invention, what is claimed is:

1. In a transmission for a motor vehicle having front wheels and rear wheels operably interconnected by a selectable four-wheel drive including a coupling for selectively applying torque to the front wheels of the vehicle to switch between a two-wheel drive mode of operation and a four-wheel drive mode of operation, said coupulng including a drive member rotatable with the rear wheels and a driven member rotatable with the front wheels, the drive and driven members being movable axially relative to one another, the improvement comprising:

teeth on the drive and driven members which mesh with one another in a first relative axial position of the drive and driven members to transmit torque with a limited degree of lost motion from the drive member to the driven member and which are disengaged from one another in a second relative axial position of the drive and driven members to disconnect the drive to the front wheels, first determining means for determining slip between the rear wheels and the road surface, said first determining means including sensing teeth respectively provided on the drive and driven members, the number of sensing teeth respectively being twice the number of the respective teeth on the drive and driven members for transmitting torque, and actuating means for axially moving the drive and driven members between the first and second relative positions in dependence upon the determined presence or absence of slipping of the rear wheels.

2. The transmission of claim 1 wherein the first determining means includes second determining means for determining the direction of torque transmission through the coupling by monitoring the direction in which the lost motion is taken up in the coupling.

3. The transmission of claim 2 wherein the teeth on the drive and driven members of the coupling engage one another with lost motion and the second determining means includes monitoring means for monitoring the relative angular displacement of the drive and driven members.

4. In a transmission for a motor vehicle having front wheels and rear wheels operably interconnected by a selectable four-wheel drive including a coupling for selectively applying torque to the front wheels of the vehicle to switch between a two-wheel drive mode of operation and a four-wheel drive mode of operation, said coupling including a drive member rotatable with the rear wheels and a driven member rotatable with the front wheels, the drive and driven members being movable axially relative to one another, the improvement comprising:

teeth on the drive and driven members which mesh with one another in a first relative axial position of the drive and driven members to transmit torque with a limited degree of lost motion from the drive member to the driven member and which are disengaged from one another in a second relative axial position of the drive and driven members to disconnect the drive to the front wheels;

first determining means for determining the percentage slip of the rear wheels relative to the front wheels;

second determining means for determining the rotational velocity of the drive and driven members wnen the coupling, is not engaged;

direction determining means for determining the direction of torque transmission through the coupling when engaged, the second determining means and the direction determining means including sensing teeth respectively provided on the drive and driven members, the number of sensing teeth respectively being twice the number of the respective teeth on the drive and driven members for transmitting torque; and actuating means for axially moving the drive and driven members between the first and second relative positions in dependence upon the value of the determined percentage slip.

5. The transmission of claim 4 wherein the first determining means determines the percentage slip by computing the ratio of the difference of the rotational velocity of the drive and driven members to the rotational velocity of the drive member.

6. The transmission of claim 5 wherein the angle of lost motion between the teeth on the drive and driven members when engaged is smaller than the angle between the centers of two adjacent sensing teeth on the drive member or of two adjacent sensing teeth on the driven member.

* * * * *